E. EASTLACK.
Detaching Horses.
No. 1,467.
Patented Jan. 10, 1840.
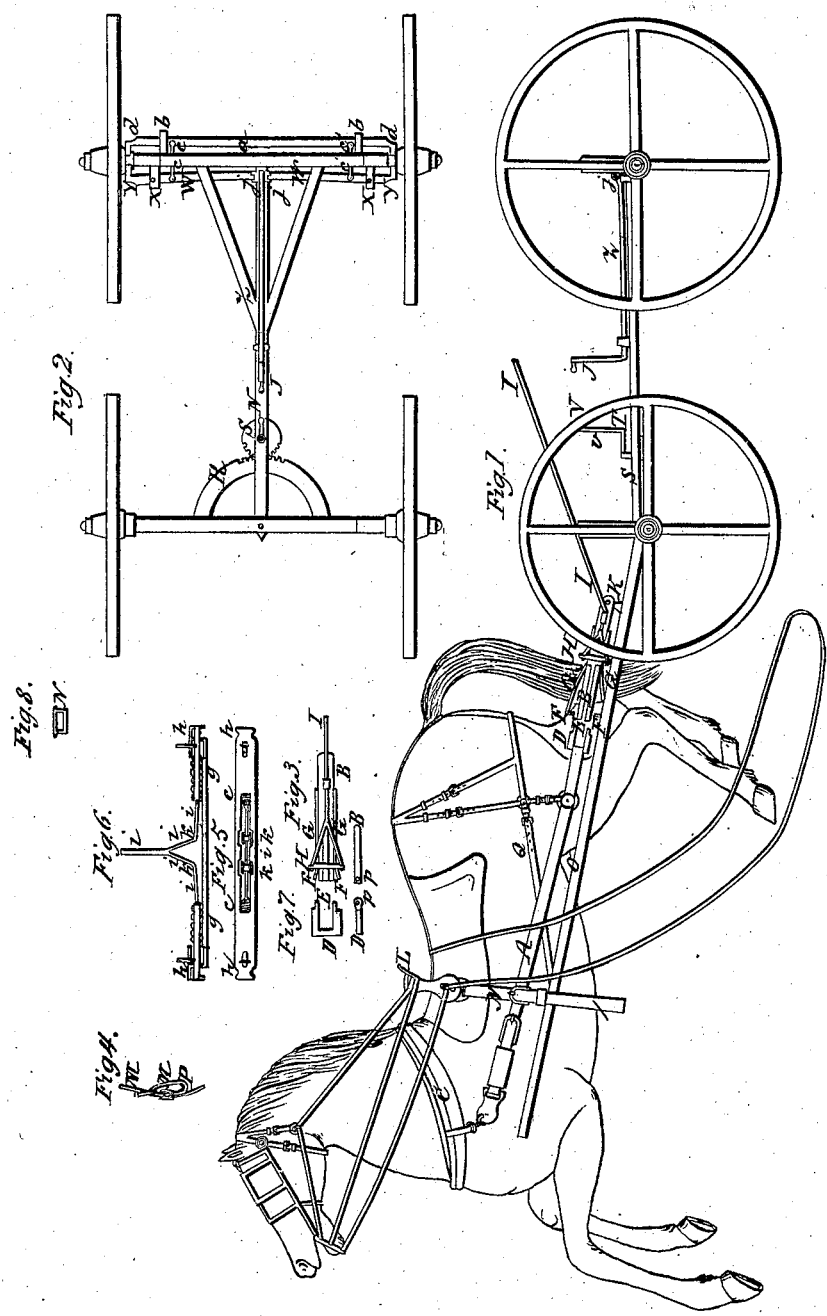

UNITED STATES PATENT OFFICE.

EDWIN EASTLACK, OF GREENWICH TOWNSHIP, CUMBERLAND COUNTY, NEW JERSEY.

MAKING SAFETY HARNESS AND CARRIAGES TO PREVENT ACCIDENTS FROM THE RUNNING AWAY OF HORSES.

Specification of Letters Patent No. 1,467, dated January 10, 1840.

*To all whom it may concern:*

Be it known that I, EDWIN EASTLACK, of the township of Greenwich, in the county of Cumberland and State of New Jersey, have invented a new and useful improvement in harness and carriages to prevent accidents from the running away of horses, called "the improved safety harness and carriage," which is described as follows, reference being had to the annexed drawings of the same, making part of this specification.

The nature of my invention consists in so constructing the traces—each one being in two parts connected together by spring bolts while the horse is drawing the vehicle at an ordinary speed and held thus by a clasp, which clasp (when the horse runs away) is drawn back by the driver by means of a cord attached to it, leading inside and laid hold of by him, which suffers the spring bolts to fly asunder from the traces, which are thus separated, leaving the parts attached to the swingle-tree with the carriage behind, while the horse takes with him the rest of the harness, the tugs being so constructed with metallic plates, pin and roller as to slip over the shafts or thills without any impediment, and also in having a pinion attached to the perch working into a cogged segment fastened to the forward axle-tree, which pinion is turned by a lever inside the carriage for the purpose of steering the carriage after the horse is disengaged therefrom, and likewise in the construction and application of a double clamp brake which is made to embrace the hubs by means of a combination of levers and rods placed under the carriage body and operated by the driver by means of one of the levers which extend inside the carriage for the purpose of gradually arresting the motion of the carriage, and also in constructing the ends of the swingle-trees with spring bolts, cords and pulleys for disengaging the traces from the ends thereof instead of separating the traces, as before mentioned.

To enable carriage and harness makers to make and use my invention, I will here describe its construction and operation.

Figure 1, is a side view representing the horse as disengaged from the swingle-tree and about to leave the shafts. Fig. 2, is a top view of the carriage. Fig. 3, represents the spring bolts as closed and passing through the trace when the parts are connected; Fig. 4, view of the tug irons and roller; Fig. 5, view of a swingle tree with spring bolts, &c.; Fig. 6, section of ditto; Fig. 7, the metallic bail; Fig. 8, sliding clasp.

Similar letters refer to similar parts in the drawings.

*The disengaging apparatus.*—The traces A are made in the following manner: Each trace is made in two parts A and B, one part being of greater length than the other part. One end of the longer A part is attached to the hame C in the usual manner and is called the hame trace. To the other end is secured a metallic bail D having one of its sides open, as at E, Fig. 7, to admit one end of the short part B of the trace called the swingle tree trace, through which and the sides of said bail are made perforations *p* corresponding with each other when the short part of the trace B is inserted and into which bail are inserted two pins F F, fastened to the ends of two springs G, G, secured to the springs of the short part of the trace by rivets passing through the springs and trace and the swingle tree part of the trace when thus inserted in the bail and the springs contracted, so as to cause the pins to pass through them, are held by a rectangular sliding clasp H, Figs. 1 and 8, attached to the end of a cord I leading inside the carriage for the driver to lay hold of and draw by when the clasp is to be removed for disengaging the parts of the trace. The other end of the short part of the trace is attached to the end of the swingle tree K in the usual manner. The other trace on the opposite side (not seen in the drawing) being similarly constructed and applied need not therefore be described, a description of one of them answering for the other. The short reins are held on the saddle hook by means of a spring L, Fig. 1, fastened to the saddle and pressing against the hook, which keeps them from slipping off.

The tug irons M, Fig. 4, are made each from a flat plate in an oval shape forming a loop attached to the lower end of the tug strap N. They embrace the shafts or thills O. In this curved plate is placed a roller P turning on a pin passing through the sides of said oval or curved loop. This roller works against the shaft hook by which the carriage is held back, the breeching being attached to the tug irons by a strap Q leading from said tug irons to the breeching ring.

By this construction of tug irons the harness is at once liberated from the thills or shafts as soon as the parts of the traces are separated by drawing the clasp from the springs.

*The steering apparatus.*—The cogged segment R, Fig. 2, for steering or guiding the carriage is secured to the forward axle tree by letting both its ends into the same, the cogs toward the hind axle-tree, and works below the perch. The pinion S which works into said cogged segment is also placed below the perch, its axle passing vertically through the same, to which is fastened a horizontal arm T, Fig. 1, to this a vertical rod U and to the upper end of this a horizontal handle V for turning the cog-wheel in steering or guiding the carriage when the horse is liberated.

*Apparatus for arresting the motion of the carriage.*—The double clamp brake for arresting the motion of the carriage consists of two levers W, Fig. 2, moving on fulcra XX on one side of the hind axle-tree, to the short end of which levers segment collars or semi-circular bails Y are fastened, which partly embrace the hind hubs, and to the long ends of said levers, which are (by a movable joint $j$, Figs. 1 and 2) connected together, is attached a horizontal rod $z$ moving vertically over the perch. It turns up vertically at one end and passes through the bottom of the carriage, to which a handle J is fastened for moving it. Its other end turns down vertically at $j$ and is there forked or branched into two parts, to each of which is connected a lever W. The angle of said lever Z is inserted in a mortise in a horizontal arm projecting from the hind axle tree, and through said arm and the angle of the lever there passes horizontally a pin which serves as the fulcrum of said lever. On the opposite side of the hind axle-tree and lying parallel with it is placed a bar $a$, moving in mortises in two horizontal supports and guides $b$ inserted horizontally into the axle tree, which bar is attached to and moves with the levers in the same direction by means of links $c'$, $c'$, which connect them together, and to the ends of said bar are fastened two segment or semi-circular collars $d$, $d$, which also partly embrace the hubs on the opposite side and are designed to accomplish the same purpose as those just mentioned—namely to produce friction on the hubs for stopping the motion of the carriage.

*Operation.*—When the horse runs away the driver pulls the cord I, which draws the clasp H from the springs G, which instantly fly asunder in extending themselves, drawing the bolts or pins from the ends of the traces A, B, the cord being branched, so as to move both clasps at the same time. The traces being thus separated the driver throws the reins out of the carriage, which are carried off by the horses along with all the harness except the short pieces B of the traces, which remain on the swingle-tree with the springs, clasps and cord attached to them, as represented, the shafts being held up by suitable straps or by the driver holding the cord I, and the carriage continuing to move onward from its momentum must be guided by the driver, which is done by his laying hold of the handle V and turning the pinion S, which moves the segment R, and this the forward axle-tree, and thus guides or steers the carriage. He then gradually stops its motion by laying hold of the handle J of the brake and moving it upward in the carriage, which moves the long ends of the levers W in the direction of the movement of the carriage and the short ends in a contrary direction or toward the hind axle tree, causing the segment collars Y to partly embrace the hubs and produce friction thereon. At the same time the segment collars $d$ on the opposite side are brought hard against the hubs by means of their connection with said levers W by the parallel bar $a$ and links $c$ and thus the friction on the hind hubs is increased to such a degree as to gradually arrest the motion of the carriage at the pleasure of the driver.

The swingle-tree may be so constructed and used as to effect the object of suddenly disengaging the horse from the carriage in the act of running away instead of dividing the traces, the horse carrying away with him both traces. To effect this object the swingle-tree must be constructed with a sliding bolt $e$ $e$, Figs. 5 and 6, at each end, to which bolt the trace is hooked. Said sliding bolt is held in an extended position by a spiral spring $g$ $g$ surrounding it, the outer end of said bolt passing through apertures in a metallic box fastened on the end of the swingle-tree for strengthening it and for preventing the traces slipping off while drawing the carriage, and to the inner end of the bolt is attached a cord $z$ passing around a pulley K in the swingle-tree and running thence to the inside of the carriage near the driver. The other end of the swingle tree is similarly provided with a sliding bolt $e'$ spring, cord and pulley, which cord after passing over the pulley unites with the first mentioned cord at $i$, Fig. 6, so that the main branch is pulled by the driver both bolts are drawn at the same time toward each other and both traces disengaged simultaneously and both spiral springs contracted, which as soon as the cord is again loosened extend themselves by the exertion of the contracted springs to extend themselves, thus driving the bolts out again ready to receive and hold the end of the traces, which must be hooked over the bolts by hand. The outer plate $h$ of the metallic box into which the end of the bolt $e$ enters not only serves to prevent the bolt from bending or breaking but it also prevents the traces from slipping off until the bolt is drawn therefrom.

What I claim as my invention and which I desire to secure by Letters Patent consists—

1. The combination of the spring bolts G, E bails D, clasps H and cord I with the divided traces A, B, for disengaging a horse in the act of running away, from a carriage, as before described.

2. The iron tug M in combination with the roller P as herein described to prevent the shafts from hanging in the tugs when the horse is liberated.

3. The combination and arrangement of the levers, rods, and semicircular collars for gradually arresting the motion of the carriage in the manner herein set forth, the principle however of arresting carriages by means of brakes applied to the hubs is not claimed.

4. The combined sliding bolts, spiral springs, cord, and pulleys in combination with the swingle-tree for disengaging the traces therefrom as described.

EDWIN EASTLACK.

Witnesses:
 JAMES F. WILLIAMS,
 JOSEPH A. MILLER.